Patented Apr. 28, 1931

1,802,517

UNITED STATES PATENT OFFICE

JOSEPH EDOUARD GUSTAVE LAHOUSSE, OF LYON, FRANCE

ELECTRICAL INSULATING MATERIAL

No Drawing. Application filed August 1, 1927, Serial No. 210,015, and in France August 12, 1926.

The present invention has for its object the production of an insulating material which is primarily designed for use as a dielectric for condensers. This material is composed of a porous or fibrous substance or body, such as paper, for example, impregnated with a metal resinate (and in particular, with resinate of zinc), either in a pure state or mixed with easily-fusible substances intended to increase its fluidity in molten state without substantially changing its dielectric property; such substances preferably being amides or compounds with amide bases.

The invention also involves the use, in manufacturing the above-described insulating material, of a porous or fibrous body that contains a metallic oxide in suitable proportions; such substance or body being afterwards impregnated with resin which, by reaction with the oxide, forms a metallic resinate.

Metal resinates are remarkable both for their very pronounced resistivity and, when employed in an alternating electric field, for the extremely slight liberation of heat which they occasion. These characteristics are of special importance in the manufacture of condensers, since they insure an excellent insulation between the armatures thereof and, when the condensers are operating under alternating current, an extremely low consumption of energy. The consumption of energy, which is manifested by liberation of heat, results for the most part from the phenomenon termed "dielectric hysteresis" by physicists. Moreover, it has been known for some years that during ordinary operation with alternating current, the heating of the insulation is one of the causes that tends to produce breaking. In fact, the liberation of heat becomes the more intense, according as the temperature rises, so that for any given apparatus there is a temperature limit beyond which breaking is only a question of time.

It follows that, for a given apparatus, the capacity limit is that which corresponds to the temperature limit defined above, and beyond which the liberation of heat is no longer sufficient. Thus, for example, for an alternating current of given frequency, in proportion as the voltage applied at the poles of the apparatus is increased, the normal temperature of operation rises and it is impossible to exceed a certain voltage limit without reaching the temperature limit. Conversely, for a given voltage, there will likewise be a frequency limit beyond which the temperature limit is reached.

By reducing the dielectric losses, the heating of the apparatus is reduced in the same voltage and frequency conditions, so that the apparatus can thus withstand higher voltages and frequencies with perfect safety. As the capacity of a condenser is a function of the voltage and frequency of the current fed to it, it can be concluded therefrom that the reduction of the dielectric losses not only improves the efficiency, which is very apparent, but even increases the power rating of the apparatus, at equal volume.

The above-specified, known properties of metal resinates are completed by their further property of melting at a temperature such as to enable them to be used for impregnating porous, fibrous or textile materials, paper in particular; more precisely, paper used to insulate the armatures of a large proportion of the condensers now being made commercially, such paper usually being impregnated with paraffin, artificial resins, carnauba and other waxes, and various mixtures of these substances.

Furthermore, the viscosity of the melted resinates, if it be too high to permit impregnation being effected readily, can be decreased by adding a certain quantity of another suitable substance. As the proportion of the added substance can be kept low (from 10 to 15%, for instance, or even less), much latitude is possible in selecting this substance which, naturally, must not, above all, be viscous when in liquid state and which must be sufficiently insulating. Among other suitable substances, it is possible to select bodies of the chemical series of the amides and their derivatives which offer a large number of compounds fusible at temperatures convenient for this use. There may be mentioned among these bodies, acetanilide, urethane, paratoluene sulfonamide, and ethylacetanilide. The mixture can be obtained in the simplest way by bringing the additional substance to the state of fusion and then adding the resinate gradually, while stirring and continuing the heating.

Resinates have long been used in the varnish industry, and in commerce there are found the resinates of calcium, aluminum, zinc, lead and manganese, as well as the double resinates. It is known that they can be prepared by double decomposition with an alkali resinate, or by means of the so-called "fusion" process; the latter being the more economical of the two and giving products of less value for the manufacture of varnishes, but apparently being actually far more suitable than the former for obtaining products for dielectric usage. Among the resinates, the zinc one seems, at least at the present moment, to be the most important, due to the properties which it combines, viz: its impermeability to moisture and the substantial variation of its fusing-point according to its zinc content. The fusing temperature which is about 70° C. for resin, rises to 170° C. for a zinc content of about 6%.

The chemical nature of resinates is still poorly understood, and the resins obtained from various conifers are themselves mixtures of more or less stable acids, certain of which result from the transformation of acids present in the original gum. This modification, which is accomplished by isomerization, gives rise to a term which seems to be in common use, viz: abietic acid.

To effect the manufacture of resinates by the fusion process there must be an accompanying modification of the acids by isomerization. In any event, a process of making resinates can be conceived where the resin is first isomerized, to proceed only thereafter with the production of the resinates. As is known, this isomerization may be effected, for example, either by a prolonged heating of the resin to 150° C., or, more rapidly, by causing gaseous hydrochloric acid to act as a catalyzer on the melted resin at 150° C.

Hence, in carrying out the present invention, the products obtained after a more or less complete isomerization of the resin can be utilized.

As a particular example of resinates, there may be indicated an acid sodium abietate $(C_{20}H_{30}O_2)3.C_{20}H_{29}O_2Na$, fusible at about 175° C., in which, as seen by the chemical formula, only a quarter of the total acidity is neutralized. This abietate possesses the remarkable property of being very slightly soluble in most solvents, water included, contrary to what takes place ordinarily with sodium salts.

The invention is applicable not only to condensers but also to all kinds of apparatus utilizing dielectrics, whether or not the latter be disposed in layers or sheets separated by metal foil, as in the so-called condenser bushing. It is particularly adapted to be used in the manufacture of insulating tubes and cylinders made of impregnated paper, and in the manufacture of condensers, electric cables and bushings.

In the special case of objects obtained by impregnating paper or fibrous material, the present invention can be carried out, as follows:

The paper or other fibrous material has incorporated in it, in the course of its manufacture, the quantity of oxides necessary for the production of the resinates. Impregnation takes place with the resin alone, and the resinates are formed in the fibrous material itself.

The advantage of operating in this way resides, first, in the fact that the fluid material, which must be caused to penetrate into the fibrous mass, is much less viscous, at the same temperature, than the final resinate. Hence, this penetration can readily be effected at a comparatively low temperature, 100–140° C., for instance, the resinates forming thereafter in the mass itself at the higher temperature of 180–200° C. The rise in temperature must be effected, obviously, at such a speed that the gaseous reaction products can escape progressively without speeding up the reaction.

Finally, the fibrous material becomes impregnated by pure metal resinates, and the operation is very easy, resin being very fluid in the molten state.

On the contrary, as stated above, metal resinates by themselves generally are too viscous for good, commercially-practical impregnation, and some additional substances, such as amides, must be added to decrease their viscosity, so that direct impregnation with pure metal resinates is commercially impossible.

It is to be noted that the impregnation with metal resinates apparently diminishes the dielectric constant as compared with that of ordinary impregnating agents, which a slight disadvantage in the case of condensers but an advantage in cables.

*Example 1*

About 10 kgs. of paratoluenesulphonamide, which melts at 136° C., are heated in an iron vessel to 150° C. 90 kgs. of resin are added, and after complete fusion, the mass is heated to 170° C. Then the zinc oxide (sold commercially under the same of "zinc white" for painting purposes) is added, but in a progressive manner, in order to prevent too great an abundance of the froth formed by the reaction. This is continued until the froth disappears and the temperature has been raised little by little to 185-190° C., during which time 2.4 kgs. of zinc oxide have been added. The mixture thus obtained is then ready for use, and into it are plunged the paper condensers or the pasteboard tubes, or any other objects to be impregnated, which are left therein for about four or five hours, the temperature being kept between 150 and 200° C. Thereafter the temperature is allowed to drop, and when it has fallen to about 120° C., the articles are withdrawn and left to cool completely.

*Example 2*

The paper condensers or tubes, or other articles of like character, are made of a special paper containing 3-4% by weight of zinc oxide obtained by combustion of zinc. This oxide, which is in the form of an impalpable powder such as is used for painting, is incorporated by mixing it in the paper pulp during its manufacture and before calendering, the manufacture of the paper proceeding thereafter in the usual way.

The articles to be impregnated are plunged into an bath of resin at 120° C., which is then raised slowly to 200° C. in course of about four hours, being guided in the temperature rise by the liberation of gas which occurs at the surface of the bath and which should never be turbulent. When the liberation of gas has stopped, the reaction is finished, and the bath is then left to cool. The articles can be removed when the temperature of the bath has dropped to 180° C.

I claim as my invention:—

1. An electrical insulating material of high dielectric property, specially designed for the manufacture of condensers, comprising a porous body impregnated with a metal resinate mixed with a compound of the amide series which will increase the fluidity of such resinate in a melted state without substantially changing its dielectric properties.

2. An electrical insulating material of high dielectric property, specially designed for the manufacture of condensers, comprising a porous body impregnated with zinc resinate mixed with a compound of the amide series which will increase the fluidity of such resinate in a melted state without substantially changing its dielectric properties.

3. A process of manufacturing an electrical insulating material of high dielectric property, specially designed for the manufacture of condensers, comprising the steps of forming a porous body having an oxide dispersed therein, and then soaking said body in melted resin.

In testimony whereof I affix my signature.

JOSEPH EDOUARD GUSTAVE LAROUSSE.